United States Patent [19]

Decker et al.

[11] Patent Number: 5,780,560
[45] Date of Patent: Jul. 14, 1998

[54] EPOXY POWDER COATING WITH WRINKLE FINISH

[75] Inventors: Owen H. Decker, West Reading; Jeno Muthiah, Wernersville; David A. Mountz, Birdsboro, all of Pa.

[73] Assignee: Morton International, Inc., Chicago, Ill.

[21] Appl. No.: 802,697

[22] Filed: Feb. 19, 1997

Related U.S. Application Data

[62] Division of Ser. No. 650,081, May 17, 1996, Pat. No. 5,688,878.

[51] Int. Cl.$^6$ .................. C08G 59/14; C08L 63/00
[52] U.S. Cl. .................. 525/533; 525/934; 427/195; 427/201; 427/257; 427/372.2
[58] Field of Search .................. 525/533, 934; 427/195, 201, 257, 372.2

[56] References Cited

U.S. PATENT DOCUMENTS

| 2,918,491 | 12/1959 | Radue | 260/474 |
|---|---|---|---|
| 3,458,566 | 7/1969 | Yakimik | 260/521 |
| 3,468,942 | 9/1969 | Blum | 260/520 |
| 3,557,198 | 1/1971 | Yakimik | 260/521 |
| 3,639,928 | 2/1972 | Bentley et al. | 260/47 |
| 3,954,898 | 5/1976 | Hirota et al. | 260/837 |
| 3,996,175 | 12/1976 | Schreiber et al. | 260/28 |
| 4,094,721 | 6/1978 | Sturm et al. | 156/309 |
| 4,264,758 | 4/1981 | Waddill | 528/100 |
| 4,271,277 | 6/1981 | Golownia | 525/351 |
| 4,341,819 | 7/1982 | Schreffler et al. | 427/195 |
| 4,419,477 | 12/1983 | Saeki et al. | 524/290 |
| 4,528,127 | 7/1985 | Holderegger et al. | 525/530 |
| 4,556,693 | 12/1985 | Corcoran et al. | 525/162 |
| 4,599,401 | 7/1986 | Koleske | 525/408 |
| 4,677,170 | 6/1987 | Monnier et al. | 525/539 |
| 4,701,378 | 10/1987 | Bagga et al. | 548/352 |
| 4,751,112 | 6/1988 | Smith, Jr. et al. | 427/388.3 |
| 4,757,117 | 7/1988 | Moss | 525/483 |
| 4,997,951 | 3/1991 | Bagga | 428/414 |
| 5,021,513 | 6/1991 | Bagga | 525/328.8 |
| 5,115,025 | 5/1992 | Koleske et al. | 525/162 |
| 5,115,083 | 5/1992 | Piedrahita et al. | 528/230 |
| 5,124,405 | 6/1992 | Erickson | 525/92 |
| 5,212,263 | 5/1993 | Schreffler | 525/533 |
| 5,256,713 | 10/1993 | Jacobs, III et al. | 524/99 |
| 5,447,751 | 9/1995 | Horinka et al. | 427/257 |

FOREIGN PATENT DOCUMENTS

| AO195660 | 9/1986 | European Pat. Off. |
| 48-084199 | 11/1973 | Japan |
| 51-073030 | 6/1976 | Japan |
| 5271577 | 10/1993 | Japan |

OTHER PUBLICATIONS

Registry file for registry No. 122-25-8, not available.
CA Selects: Coatings, Inks, & Related Products. Issue 22, 1993, p. 7 119: 182962w.
Research Disclosure: Jul. 1993 No. 351 457-459.
Modern Paint and Coatings. Oct. 1980, pp. 88-92 (Formulation Techniques Using Triflic Acid Salts).
Journal of Paint Technology, vol. 44, No. 565, Feb. 1972 (Powder Coating: Why-How-When).

*Primary Examiner*—Randy Gulakowski
*Attorney, Agent, or Firm*—Nick C. Kottis; Charles N. Lovell; Gerald K. White

[57] ABSTRACT

Powdered coating compositions and methods for obtaining improved wrinkled finishes with epoxy powder coatings are provided which utilize curing agents other than commercially available methylenedisalicylic acid.

17 Claims, No Drawings

EPOXY POWDER COATING WITH WRINKLE FINISH

This is a divisional of application Ser. No. 08/650,081 filed on May 17, 1996, now U.S. Pat. No. 5,688,878.

BACKGROUND OF THE INVENTION

This invention relates generally to epoxy powder coatings and, more particularly, to epoxy powder coatings that yield improved wrinkle finishes.

Wrinkle finishes are desired in many applications and are commonly applied to office equipment such as word processing system components, typewriters, staplers, filing cabinets, and the like. In addition to being aesthetically pleasing, these finishes can provide certain utilitarian advantages in that they are of relatively low gloss (i.e., not shiny), they minimize the appearance of scratches, and they can hide the presence of defects in the surface of a substrate even when the coating has been applied thereon in the form of a thin film.

Epoxy resin-based powder coatings having wrinkle finishes are taught in U.S. Pat. No. 4,341,819, the teachings of which are incorporated herein by reference. The coating powder disclosed therein achieves a wrinkle finish by means of a special curing agent, methylenedisalicylic acid (MDSA), acting on the epoxy groups of the resin.

Commonly assigned U.S. Pat. No. 5,212,263 discloses an epoxy powder coating composition which includes an epoxy resin, MDSA as a curing agent, and an adduct of an imidazole and a Bisphenol A epoxy resin as a cure agent or catalyst. Such a composition is disclosed as providing a finish having a more predictable texture.

Commonly assigned U.S. Pat. No. 5,447,751 is directed to providing a predictable method for forming weatherable wrinkle finish coatings of various colors. This patent discloses the providing of a wrinkle finish with a powder coating of a hydroxyl-functional resin having a functionality greater than 2, an aminoplast resin as a curing agent, and cyclamic acid as a catalyst.

Unfortunately, epoxy powder coatings with wrinkle finishes which utilize conventionally available MDSA as a curing agent can, under certain circumstances, result or produce wrinkle finishes with less than desired properties or characteristics. For example, in some situations, some such coatings, especially light colored coatings, can experience discoloration upon being cured. Also, some such epoxy powder coatings may provide wrinkle finishes which lack consistency in appearance, e.g., wrinkle patterns which result therefrom may be relatively poorly defined.

Thus, there is demand and a need for an epoxy powder coating which provides a finish with improved consistency and depth of wrinkle pattern, as compared to the finish provided by coatings which utilize conventionally available MDSA as a curing agent.

Also, there is a demand and a need for an epoxy powder coating which does not exhibit undesired discoloration upon being cured.

SUMMARY OF THE INVENTION

A general object of the invention is to provide an improved epoxy powder coating that yields a wrinkle finish.

A more specific objective of the invention is to overcome one or more of the problems described above.

The general object of the invention can be attained, at least in part, through an improvement in a powdered coating composition adapted to provide a wrinkled finish. The composition includes an epoxy resin, a catalyst and a curing agent. The improvement being that the curing agent is other than methylenedisalicylic acid, 3,5-bis[(3-carboxy-4-hydroxyphenyl)methyl]-2-hydroxybenzoic acid, 5-[3-carboxy-2-hydroxyphenyl)methyl]-3-[(3-carboxy-4-hydroxyphenyl)methyl]-2-hydroxybenzoic acid, 3-[3-carboxy-2-hydroxyphenyl)methyl]-5-[(3-carboxy-4-hydroxyphenyl)methyl]-2-hydroxybenzoic acid, 3,5-bis[(3-carboxy-2-hydroxyphenyl)methyl]-2-hydroxybenzoic acid, and has a structure in general accordance with the formula

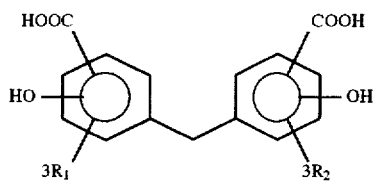

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups.

The general object of the invention can also be attained, at least in part, through a powdered coating composition which includes an epoxy resin, a catalyst and a curing agent, which curing agent includes methylenedisalicylic acid and has a cation to sulfur equivalent ratio of at least about 0.4 and no more than about 3.

The prior art fails to provide compositions and methods which produce or result in white, light, or pastel colored powder coatings which do not exhibit undesired discoloration upon being cured. The prior art also fails to provide as consistent and well-defined wrinkle pattern, as desired, in many powder coatings, especially light colored coatings.

The invention further comprehends a method for obtaining a wrinkled finish on a substrate surface. The method includes the step of applying onto the substrate surface a powdered coating composition which includes an epoxy resin, a curing agent and a catalyst. The method involves the improvement of the curing agent being other than methylenedisalicylic acid, 3,5-bis[(3-carboxy-4-hydroxyphenyl)methyl]-2-hydroxybenzoic acid, 5-[3-carboxy-2-hydroxyphenyl)methyl]-3-[(3-carboxy-4-hydroxyphenyl)methyl]-2-hydroxybenzoic acid, 3-[3-carboxy-2-hydroxyphenyl)methyl]-5-[(3-carboxy-4-hydroxyphenyl)methyl]-2-hydroxybenzoic acid, 3,5-bis[(3-carboxy-2-hydroxyphenyl)methyl]-2-hydroxybenzoic acid, and having the general structural formula of

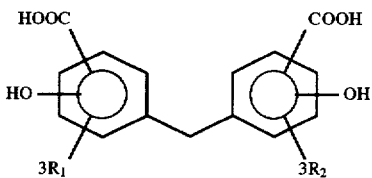

wherein each $R_1$ is selected from the group consisting of H, $C_1$–$C_{20}$ alkyl groups, $C_6$–$C_{10}$ aryl groups and aryl substituted methylene groups and each $R_2$ is selected from the group consisting of H, $C_1$–$C_{20}$ alkyl groups, $C_6$–$C_{10}$ aryl groups and aryl substituted methylene groups.

The invention still further comprehends a powdered coating composition adapted to provide a wrinkled finish and which composition includes an epoxy resin, a catalyst and a curing agent, wherein a precursor of the curing agent includes methylenedisalicylic acid and has a cation to sulfur equivalent ratio of less than about 0.4. In accordance with this aspect of the invention, the precursor is then treated to have a cation to sulfur equivalent ratio of at least about 0.4 and no more than about 3 to form the composition curing agent.

The invention also involves a method wherein a suspension which includes methylenedisalicylic acid solution and which suspension has a cation to sulfur equivalent ratio of less than about 0.4 is treated to form a modified suspension including methylenedisalicylic acid and having a cation to sulfur equivalent ratio of at least about 0.4 and no more than about 3.

As used herein, references to "phr" are to be understood to refer to its usual sense as meaning parts per hundred parts resin, by weight.

Other objects and advantages will be apparent to those skilled in the art from the following detailed description taken in conjunction with the appended claims.

DETAILED DESCRIPTION OF THE INVENTION

The present invention provides epoxy powder coatings that yield improved wrinkle finishes.

The epoxy powder coating compositions of the invention typically include an epoxy resin, a catalyst and a curing agent, while the method for obtaining a wrinkled finish on a substrate surface involves applying such an epoxy powder coating composition of the invention onto a substrate surface.

The epoxy resins used in the invention include Bisphenol A type epoxies with epoxide equivalent weights of between about 600 and about 1100, or mixtures of such epoxies. Preferably, the major portion, i.e., over about 50% of the epoxy resin, is an epoxy resin with an equivalent weight between about 600 and 750.

The catalysts used in the invention are typically of the Lewis acid type and are typically utilized at a level of about 0.3 phr to about 1.5 phr, preferably at a level of about 0.5 phr to about 1 phr.

In accordance with a first embodiment of the invention, the curing agent used is other than methylenedisalicylic acid (MDSA), 3,5-bis[(3-carboxy-4-hydroxyphenyl)methyl]-2-hydroxybenzoic acid, 5-[3-carboxy-2-hydroxyphenyl)methyl]-3-[(3-carboxy-4-hydroxyphenyl)methyl]-2-hydroxybenzoic acid, 3-[3-carboxy-2-hydroxyphenyl)methyl]-5-[(3-carboxy-4-hydroxyphenyl)methyl]-2-hydroxybenzoic acid, 3,5-bis[(3-carboxy-2-hydroxyphenyl)methyl]-2-hydroxybenzoic acid, and has a structure in general accordance with the formula

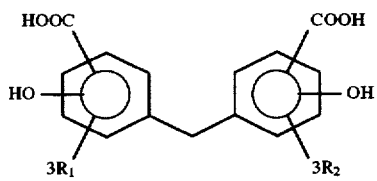

wherein each $R_1$ is selected from the group consisting of H, $C_1$–$C_{20}$ alkyl groups, $C_6$–$C_{10}$ aryl groups and aryl substituted methylene groups and wherein each $R_2$ is selected from the group consisting of H, $C_1$–$C_{20}$ alkyl groups, $C_6$–$C_{10}$ aryl groups and aryl substituted methylene groups.

In one preferred form of this embodiment, the curing agent has the general formula of [1] wherein each $R_1$ is H.

In another preferred form of this embodiment, the curing agent has the structure

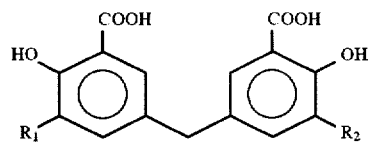

wherein $R_1$ is selected from the group consisting of H, $C_1$–$C_{20}$ alkyl groups, $C_6$–$C_{10}$ aryl groups and aryl substituted methylene groups and wherein $R_2$ is selected from the group consisting of H, $C_1$–$C_{20}$ alkyl groups, $C_6$–$C_{10}$ aryl groups and aryl substituted methylene groups.

Specific preferred forms of such curing agents include those wherein $R_1$ is $CH_3$ and $R_2$ is either H or $CH_3$.

Another aspect of the invention relates to the finding that residual sulfuric acid found present in commercially available MDSA, such as used heretofore in epoxy wrinkle powder coatings, can dramatically affect the appearance of the wrinkle coating. In the invention, it has been found that the use, in wrinkle powder coating compositions, of a curing agent of MDSA and having a cation to sulfur equivalent ratio of at least about 0.4 and no more than about 3, more preferably a cation to sulfur equivalent ratio of at least about 0.5 and no more than about 1, results in coatings with more consistent, better defined wrinkle appearance.

In one embodiment relating to this aspect of the invention, such residual sulfuric acid is neutralized to result in what is termed herein as "base-modified MDSA." The neutralization can be done during the preparation of the MDSA such as by treating the MDSA sample in aqueous slurry with a base material such as sodium hydroxide.

In one specific form of this aspect of the invention, a curing agent precursor including MDSA and having a cation to sulfur equivalent ratio of less than about 0.4, such as is common for commercially available "methylenedisalicylic acid," is treated to have a cation to sulfur equivalent ratio of at least about 0.4 and no more than about 3. In one preferred form of the invention, a curing agent precursor including MDSA and having a cation to sulfur equivalent ratio of less than about 0.4 is treated to have a cation to sulfur equivalent ratio of at least about 0.5 and no more than about 1.

For example, a suspension of MDSA having a cation to sulfur equivalent ratio of less than about 0.4 can be treated to form a modified suspension of MDSA having a cation to sulfur equivalent ratio of at least about 0.4 and no more than about 3, preferably a cation to sulfur equivalent ratio of at least about 0.5 and no more than about 1.

Various techniques can be used to measure the quantities of metal ions and sulfur in MDSA samples. One such useful technique utilized in some of the examples below is referred to as "inductively coupled plasma analysis," (ICPA).

In theory, base-modified MDSA samples should have cation/sulfur equivalent ratios of roughly 1 to 1, while water-washed MDSA samples with residual sulfuric acid should have much lower cation/sulfur equivalent ratios. ICPA-generated cation to sulfur equivalent ratio data for several base-modified and water-washed MDSA samples is included in the examples below. Examination of the data shows that cation/sulfur equivalent ratios can be used to differentiate MDSA samples based on the purification techniques used therewith.

The coating compositions of the invention typically contain the curing agent at a level between about 8 phr and about 25 phr, preferably the curing agent is included at a level between about 14 phr and about 20 phr and, in one preferred embodiment, the curing agent is included at a level of about 16 phr.

The coating powder compositions of the invention may be clear, i.e., non-pigment-loaded, or may contain from 0 phr up to about 200 phr (though generally 120 phr or less) of filler and/or pigment, relative to the weight of the total of the epoxy-functional resin. In addition, the coating composition may contain conventional additives, e.g., antioxidants, light stabilizers, flow modifiers, co-stabilizers, etc., generally at a level of about 10 phr or less.

Coating powders in accordance with the present invention can be formed in a conventional manner. For example, the components of the coating composition can be combined and blended for not more than about 15 minutes to blend well. The blended materials are then extruded, e.g., at 110° C. in a single screw or twin screw extruder, ground and screened to obtain a powder of appropriate particle size. Average particle size is typically 20–80 microns. Scalping at 60 mesh is typical to remove coarse particles. Typically, about 10% by weight of the particles are less than 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles melt, form a continuous film, and cure.

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

Curing Agent Preparations

Examples 1–3

Example 1

The components listed in TABLE 1, below, were added to a stirred glass one liter reactor under a nitrogen atmosphere to form a slurry. The slurry was heated to 100° C., stirred for 17 hrs, cooled to 30° C., and filtered to yield an acid-wet cake. The acid-wet cake was suspended in 1600 ml of water and then titrated to pH 3.1 with 25% aqueous NaOH to form a new slurry. This slurry was then filtered, and washed with 2000 ml of de-ionized water to form a washed cake. The washed cake was dried 12 hours at 60° C. in an air circulating oven to form an off-white powder weighing 197.4 g.

Example 2

The components listed in TABLE 1, below, were added to a stirred, glass one liter reactor under a nitrogen atmosphere to form a slurry. The slurry was heated to 100° C., and stirred for twelve hours, whereupon the product had separated from the reaction liquid and coalesced into a pliable mass. The mass was then cooled to 30° C., at which temperature the mass had solidified. Reaction liquids were decanted away. The solid product was then ground with a 1000 ml of water to form a coarse slurry. The slurry was filtered yielding a water-wet cake weighing 392 g. A 310 g sample of this wet cake was slurried in 400 ml of water and then neutralized with aqueous sodium hydroxide to a pH of 3.0. The neutralized slurry was then filtered and washed with 400 ml of water to yield a wet cake which was dried in an air-circulating oven at 40° C. to result in 225 g of a white powdered polybenzoic acid curing agent.

Example 3

The components listed in TABLE 1, below, were added to a stirred, glass one liter reactor under a nitrogen atmosphere to form a slurry. The slurry was heated to 100° C., stirred at 100° C. for twelve hours, and then cooled to 30° C. The cooled slurry was filtered, then washed with 200 ml of water, and then reslurried in 600 ml of water. This slurry was neutralized to pH 3.0 using 25% aqueous sodium hydroxide and then filtered to form a cake. The filter cake was washed with 500 ml of water and the washed cake was then dried at 40° C. in an air-circulating oven to form 295.4 g of a beige powdered polybenzoic acid curing agent.

TABLE 1

| COMPONENTS | CURING AGENT PREPARATIONS (grams) EXAMPLES | | |
| --- | --- | --- | --- |
|  | 1 | 2 | 3 |
| water | 404 | 354.6 | 383.7 |
| sodium naphthalene sulfonate | 1.00 | 1.35 | 1.45 |
| paraformaldehyde | 27.84 | 46.96 | 51.85 |
| sulfuric acid | 128 | 112.00 | 121.17 |
| 3-methylsalicylic acid | 200.0 | — | 199.61 |
| salicylic acid | — | 180.00 | — |
| p-hydroxybenzoic acid | — | 90.00 | 90.00 |

Powder Coating Preparations

Examples 4–6 and Comp. Ex. 1

Example 4

The curing agent resulting from Example 1, 16 parts, was combined with the other components listed in Table 2, below, and shaken in a plastic bag for 45 seconds, then melt blended through a 16 mm Prism extruder at 180° F. The extrudate was cooled, chipped, ground to a fine powder and passed through a 60 mesh screen to form a powder coating composition.

Example 5

The curing agent resulting from Example 2, 16 parts, was combined with the other components listed in Table 2, below, and shaken in a plastic bag for 45 seconds, then melt blended through a 16 mm Prism extruder at 85° F. The extrudate was cooled, chipped, pulverized and passed through a 60 mesh screen to form a powder coating composition.

Example 6

The curing agent resulting from Example 3, 16 parts, was combined with the other components listed in Table 2, below, and shaken in a plastic bag for 45 seconds, then melt-blended through a 16 mm Prism extruder at 180° F. The extrudate was cooled, chipped, pulverized and passed through a 60 mesh screen to form a powder coating composition.

Comparative Example 1

A curing agent of MDSA, 16 parts, was combined with the other components listed in Table 2, below, and shaken in a plastic bag for 45 seconds, then melt-blended through a 16 mm Prism extruder at 180° F. The extrudate was cooled, chipped, ground to a fine powder and passed through a 60 mesh screen to form a comparative powder coating composition.

TABLE 2

Powder Coating Preparations

| COMPONENT | PARTS (by Weight) |
| --- | --- |
| Curing agent | 16 |
| Low Viscosity 3-Type Epoxy Resin | 85 |
| 3-Type Epoxy with 5% Polyalkylacrylate Flow Promoter | 15 |
| Boron Trichloro/Ethyl Amine Catalyst Complex | 0.5 |
| Barium Sulfate | 4.5 |
| Titanium Dioxide | 50 |

Testing of Powder Coating Preparations

Examples 7–9 and Comparative Example 2

The powder coating compositions of each of Examples 4, 5 and 6 and comparative example 1 was tested as follows:

Pre-cleaned steel test panels 0.032 inches thick were coated with the powder coating compositions of Examples 4, 5 and 6 and comparative example 1, respectively, using standard electrostatic spray techniques and baked in an oven at 375° F. for 10 minutes. Coating gloss, color and wrinkle quality were evaluated on panels whose coating thickness fell between 0.0025 and 0.004 inches. Results are summarized in Table 3, below.

TABLE 3

WRINKLE COATINGS

| EXAMPLE | COATING | GLOSS | COLOR | APPEARANCE |
| --- | --- | --- | --- | --- |
| 7 | Example 4 | 5.0 | White | Deep, well-defined wrinkle |
| 8 | Example 5 | 14 | Near-White | Shallow wrinkle |
| 9 | Example 6 | 5.0 | Near-White | Standard Wrinkle |
| Comp. Ex. 2 | Comp. Ex. 1 | 5.3 | Pale Pink | Standard Wrinkle |

Discussion of Results

A comparison of the coatings of Examples 7–9 (each resulting from a powder coating composition which utilize a curing agent other than MDSA in accordance with the invention) with the coating of Comparative Example 2 (utilizing standard MDSA) reveals:

1. The coating of Example 7 (using the powder coating composition of Example 4, which in turn used the curing agent of Example 1) was whiter and had a more desirable wrinkle pattern than the coating produced with the heretofore known coating composition;

2. The coating of Example 8 (using the powder coating composition of Example 5, which in turn used the curing agent of Example 2) was whiter than the coating produced with the heretofore known coating composition; and 3. The coating of Example 9 (using the powder coating composition of Example 6, which in turn used the curing agent of Example 3) was whiter and had a wrinkle pattern the equivalent of that of the coating produced with the heretofore known coating composition.

Curing Agent Preparations

Examples 10–11 and Comp. Exs. 3–4

Example 10

Preparation of "Base-modified" MDSA, in Which Residual Sulfuric Acid is Neutralized With an Aqueous Base Water, 354.6 ml; sodium naphthalene sulfonate, 1.35 g; salicylic acid, 270.00 g; paraformaldehyde, 41.09 g; and 96% sulfuric acid, 112.00 g were added to a stirred glass one liter reactor under a nitrogen atmosphere to form a slurry. The slurry was heated to 100° C., stirred 8 hours and cooled to 30° C., then filtered to yield a sulfuric acid-wet cake weighing 463 grams.

The acid cake was washed with 270 ml of water, then suspended in 540 ml of water and neutralized to pH 3.0 with 25% aqueous NaOH. The slurry was heated to 80° C., stirred at 80° C. for one hour, cooled to room temperature, filtered, and washed with an additional 270 ml of solvent. The washed cake was then dried 14 hours at 50° C. in an air circulating oven to 284.1 g of off-white powdered MDSA.

Example 11

Preparation of "Base-modified" MDSA Commercially

A sample of a commercial MDSA provided by Chemicals, Inc. of Baytown, Tex. (Lot 6B9) was base-modified in a manner analogous to that used in Example 10, using commercial scale equipment.

Comparative Example 3

Preparation of MDSA by Standard, Historical Method But With Less Than Optimum Washing Water, 354.6 ml; sodium naphthalene sulfonate, 1.35 g; salicylic acid, 270.00 g; paraformaldehyde, 41.09 g; and 96% sulfuric acid, 112.00 g were added to a stirred glass one liter reactor under a nitrogen atmosphere to form a slurry. The slurry was heated to 100° C., stirred 8 hours and cooled to 30° C., then filtered to yield a sulfuric acid-wet cake weighing 470 grams.

The acid cake was washed with 270 ml of water, then suspended in 540 ml of water and heated to 80° C., stirred at 80° C. for one hour, cooled to room temperature, filtered, and washed with an additional 540 ml of water. The washed cake was then dried 14 hours at 50° C. in an air circulating oven to 284.6 g of off-white powdered MDSA.

Comparative Example 4

Preparation of MDSA by Standard, Historical Method But Using Extra Washing to Reduce Sulfuric Acid Content Water, 354.6 ml; sodium naphthalene sulfonate, 1.35 g; salicylic acid, 270.00 g; paraformaldehyde, 41.09 g; and 96% sulfuric acid, 112.00 g were added to a stirred glass one liter reactor under a nitrogen atmosphere to form a slurry. The slurry was heated to 100° C., stirred 8 hours and cooled to 30° C., then filtered to yield a sulfuric acid-wet cake weighing 410 grams.

The acid cake was washed with 270 ml of water, then suspended in 540 ml of water and heated to 80° C., stirred at 80° C. for one, cooled to room temperature, filtered, and washed with an additional 2430 ml of water. The washed cake was then dried 14 hours at 50° C. in an air circulating oven to 285.0 g of off-white powdered MDSA.

Cation/Sulfur Equivalent Ratio

Examples 12 and 13 and Comparative Examples 5–9

Inductively coupled plasma analysis (ICPA) was utilized to determine the cation/sulfur equivalent ratio for the following materials:

a. In Examples 12 and 13, the resulting material of Examples 10 and 11, respectively.

b. In Comparative Examples 5 and 6, the resulting material of Comparative Examples 3 and 4, respectively.

c. In Comparative Example 7, a typical commercial MDSA provided by Chemie Linz North America, Inc. of Ridgefield Park, N.J., Lot 5B21.

d. In Comparative Example 8, a typical commercial MDSA provided by Kalama Chemicals, Inc. of Kalama, Wash., Lot GD45003.

e. In Comparative Example 9, a typical commercial MDSA provided by Nipa Hardwicke, Inc. of Wilmington, Del., Lot K1062.

The results are provided in TABLE 4, below.

TABLE 4

CORRELATION OF MDSA CATION/SULFUR EQUIVALENT RATIOS AND COATING PROPERTIES

| CURING AGENT | CATION/ SULFUR EQUIV. RATIO | TOTAL SULFUR ppm | COATING PREP. | WRINKLE APPEARANCE |
|---|---|---|---|---|
| Example 10 | 0.55 | 1377 | Ex. 14 | Strong, Well Defined |
| Example 11 | 0.79 | 1662 | Ex. 15 | Strong, Well Defined |
| Comp. Ex. 3 | 0.09 | 1938 | Comp. Ex. 11 | Weak, Shiny |
| Comp. Ex. 4 | 0.16 | 807 | Comp. Ex. 12 | Medium, Moderately Well Defined |
| Chemie Linz Lot 5B21 | 0.09 | 2371 | Comp. Ex. 13 | Weak, Shiny |
| Kalama Lot GD 45003 | 0.017 | 1483 | Comp. Ex. 14 | Weak, Fine |
| Nipa Lot K1062 | 0.10 | 1321 | Comp. Ex. 15 | Weak, Shiny |

Discussion of Results

In Examples 12 and 13, the cation/sulfur equivalent ratio of the modified MDSA of Examples 10 and 11 were found to be 0.55 and 0.79, respectively, indicating that in each instance a substantial fraction of the residual sulfuric acid had been neutralized to sulfate salts. In contrast, in Comparative Examples 5 and 6, the cation/sulfur equivalent ratios of the MDSA preparations of Comparative Examples 3 and 4 were 0.09 and 0.16, respectively, reflecting that the measured sulfur was present as sulfuric acid. Similarly, the cation/sulfur equivalent ratios for the commercial MDSA samples tested in Comparative Examples 7–9 were 0.09, 0.017, and 0.10, respectively, again reflecting that the measured sulfur was present as sulfuric acid.

Powder Coating Preparations

Examples 14 and 15 and Comparative Examples 11–15

In these examples, the MDSA materials prepared or produced in Examples 10 and 11 and Comparative Examples 3 and 4, and the MDSA materials used in Comparative Examples 7–9, respectively, were each separately combined in a plastic bag with the raw materials listed below in Table 5, shaken together for 45 seconds, then melt blended through a 16 mm twin-screw extruder at 180° F. The extrudate was cooled, chipped, ground to a fine powder and passed through a 60 mesh screen. Pre-cleaned steel test panels 0.032 inches thick were coated using standard electrostatic spray techniques and baked in an oven at 170° C. for 10 minutes to provide a gray wrinkle coating. Coating gloss and wrinkle quality were evaluated on panels whose coating thickness fell between 0.0025 and 0.004 inches. Results are summarized in Table 4, above.

TABLE 5

WRINKLE COATING COMPOSITION

| COMPONENT | PARTS BY WEIGHT | GRAMS |
|---|---|---|
| Epoxy Resin, Type 3 | 85 | 170.0 |
| Epoxy Resin, Type 3 with 5% Polyacrylate Flow Promoter | 15 | 30.0 |
| MDSA material | 16 | 32.0 |
| Boron Trichloride: Ethyl Amine Catalyst | 0.5 | 1.0 |
| Barium Sulfate | 4.5 | 9 |
| Titanium Dioxide Pigment | 40 | 80.0 |
| Black Pigment (DeGussa FW-200) | 0.7 | 1.4 |
| Blue Pigment (Whittaker Clark UB-5005) | 0.5 | 1.0 |

Discussion of Results

A comparison of the coatings of Examples 14 and 15 (each resulting from a powder coating composition which utilized a curing agent with the MDSA appropriately modified in accordance with the invention) with the coatings of Comparative Examples 11–15 revealed:

1. That the coatings of Examples 14 and 15 provided a strong, well defined wrinkle pattern;
2. The coatings of Comparative Examples 11–15 provided weak, shiny wrinkle pattern or, at best, a medium wrinkle of moderate definition; and
3. As these coatings were moderately dark gray in color, discoloration during curing was not an issue with these coatings.

Thus, the epoxy wrinkle coatings of Examples 14 and 15 generally provided superior wrinkle patterns, as compared to the wrinkle patterns produced by heretofore known compositions. Further, Comparative Examples 11 and 12 provided a basis for understanding the effect of un-neutralized sulfuric acid on the appearance of such coatings.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In a powdered coating composition for providing a wrinkled finish, said composition comprising an epoxy resin, a curing agent and a catalyst, wherein said curing agent comprises a compound other than methylenedisalicylic acid, and has a structure in general accordance with the formula

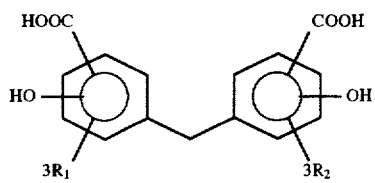

wherein each $R_1$ is selected from the group consisting of H, $C_1$–$C_{20}$ alkyl groups, $C_6$–$C_{10}$ aryl groups and aryl substituted methylene groups and wherein each R is selected from the group consisting of H, $C_1$–$C_{20}$ alkyl groups, $C_6$–$C_{10}$ aryl groups and aryl substituted methylene groups.

2. The composition of claim 1 wherein each $R_1$ is H.

3. The composition of claim 1 wherein the curing agent has the structure

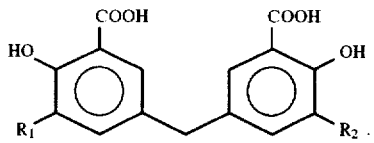

wherein $R_1$ and $R_2$ are as previously defined

4. The composition of claim 3 wherein $R_1$=$CH_3$.
5. The composition of claim 4 wherein $R_2$=H.
6. The composition of claim 4 wherein $R_2$=$CH_3$.
7. The composition of claim 1 containing between about 8 phr and about 25 phr of said curing agent.
8. The composition of claim 1 containing between about 14 phr and about 20 phr of said curing agent.
9. The composition of claim 1 containing up to about 200 phr of filler and pigment.
10. The composition of claim 1 containing at least one additive selected from the group consisting of antioxidants, light stabilizers, flow modifiers, and co-stabilizers.
11. The composition of claim 10 containing no more than about 10 phr total of said selected additives.
12. A method for obtaining a wrinkled finish on a substrate surface, said method comprising applying onto the substrate surface a powdered coating composition including an epoxy resin, a curing agent and a catalyst, curing agent comprises a compound other than methylenedisalicylic acid, and has a structure in general accordance with the formula

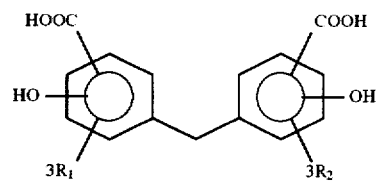

wherein each $R_1$ is selected from the group consisting of H, $C_1$–$C_{20}$ alkyl groups, $C_6$–$C_{10}$ aryl groups and aryl substituted methylene groups and each $R_2$ is selected from the group consisting of H, $C_1$–$C_{20}$ alkyl groups, $C_6$–$C_{10}$ aryl groups and aryl substituted methylene groups.

13. The method of claim 12 wherein each $R_1$ is H.

14. The method of claim 12 wherein the curing agent has the structure

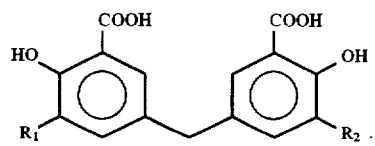

wherein $R_1$ and $R_2$ are as previously defined

15. The method of claim 14 wherein $R_1$=$CH_3$.
16. The method of claim 15 wherein $R_2$=H.
17. The method of claim 15 wherein $R_2$=$CH_3$.

* * * * *

UNITED STATES PATENT AND TRADEMARK OFFICE
CERTIFICATE OF CORRECTION

PATENT NO.   :   5,780,560
DATED        :   July 14, 1998
INVENTOR(S)  :   Decker et al.

It is certified that error appears in the above-indentified patent and that said Letters Patent is hereby corrected as shown below:

*Column 11, line 29, after "catalyst," insert --wherein said--.*

Signed and Sealed this

Sixth Day of October, 1998

Attest:

BRUCE LEHMAN

*Attesting Officer*            *Commissioner of Patents and Trademarks*